(No Model.)  3 Sheets—Sheet 1.

T. A. CHAPMAN.
CORN CUTTER AND HARVESTER.

No. 538,235.  Patented Apr. 30, 1895.

Witnesses
Severance
C. Calvert Hines

Inventor
Thomas A. Chapman
by Mason, Fenwick & Lawrence
his Attorneys (No Model.) 3 Sheets—Sheet 2.
T. A. CHAPMAN.
CORN CUTTER AND HARVESTER.
No. 538,235. Patented Apr. 30, 1895.
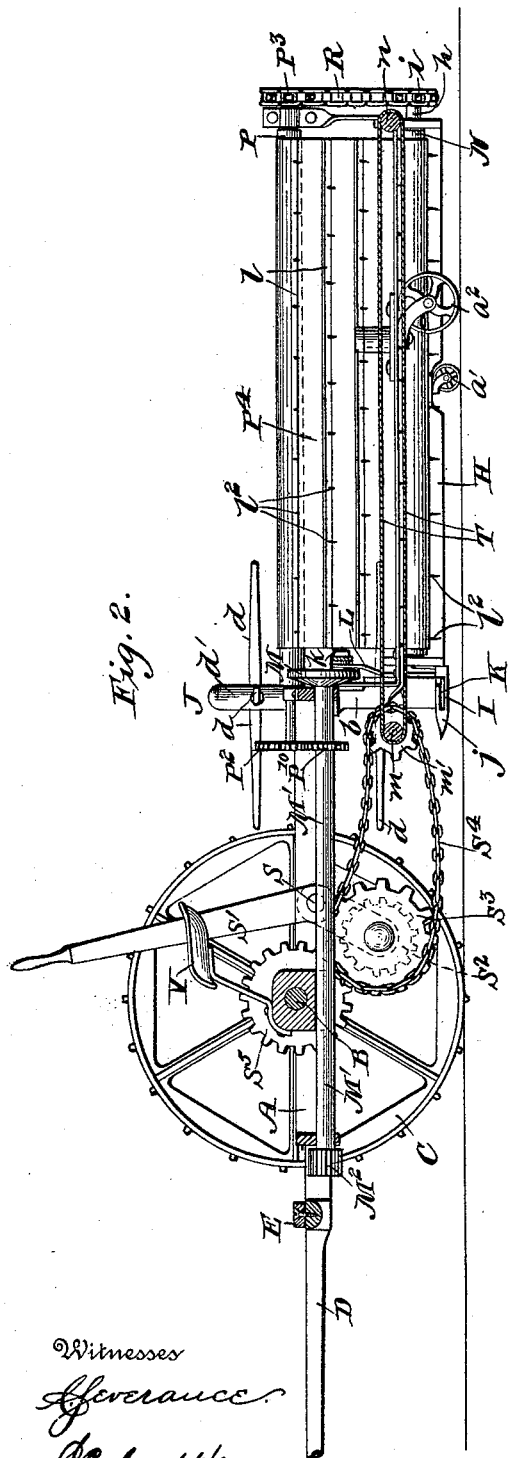
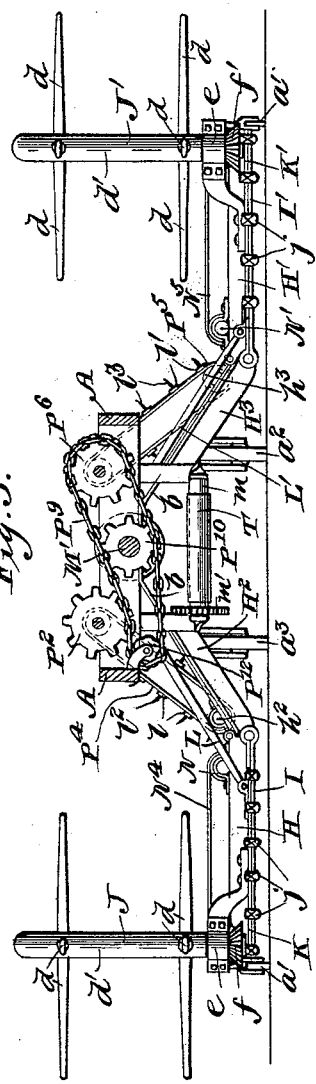
Witnesses
Inventor
Thomas A. Chapman
by Mason, Fenwick & Lawrence
his Attorneys.

(No Model.)  T. A. CHAPMAN.  3 Sheets—Sheet 3.
CORN CUTTER AND HARVESTER.

No. 538,235. Patented Apr. 30, 1895.

Witnesses
Severance
C. Calvert Hines

Inventor,
Thomas A. Chapman
by Mason, Fenwick & Lawrence
his
Attorneys.

UNITED STATES PATENT OFFICE.

THOMAS A. CHAPMAN, OF CRIGLERSVILLE, ASSIGNOR OF ONE-HALF TO EDWARD PURCELL, JR., O. B. ROLLER, AND EDWARD C. MARTZ, OF HARRISONBURG, VIRGINIA.

CORN CUTTER AND HARVESTER.

SPECIFICATION forming part of Letters Patent No. 538,235, dated April 30, 1895.

Application filed May 11, 1894. Serial No. 510,869. (No model.)

*To all whom it may concern:*

Be it known that I, THOMAS A. CHAPMAN, a citizen of the United States, residing at Criglersville, in the county of Madison and State of Virginia, have invented certain new and useful Improvements in Corn Cutters and Harvesters; and I do hereby declare the following to be a full, clear, and exact description of the invention, such as will enable others skilled in the art to which it appertains to make and use the same.

My invention relates to machines for cutting and harvesting corn on the stalk, and its object is to provide a machine which will cut two rows at a time, one on each side of the draft frame, and permit the draft frame and beam to pass between the rows; and which will have but slight side draft, and the same, on one side of the draft frame, balanced by the resistance on the other side thereof; and which will also receive the corn upon endless apron platforms as it is reeled in by horizontal reel arms and cut by saw toothed cutter bars; and carried by said platforms to other inclined, slatted and toothed aprons, carried up by the same and deposited upon a central intermittently revolved endless apron platform; allowed to collect in quantities, sufficient for a shock, upon said platform, from whence it is discharged between the ridges of the two cut rows ready to be set up in shocks and tied; and to this end my invention consists in certain novel combinations of parts as will be hereinafter described, and which are illustrated in the accompanying drawings, in which latter—

Figure 1:
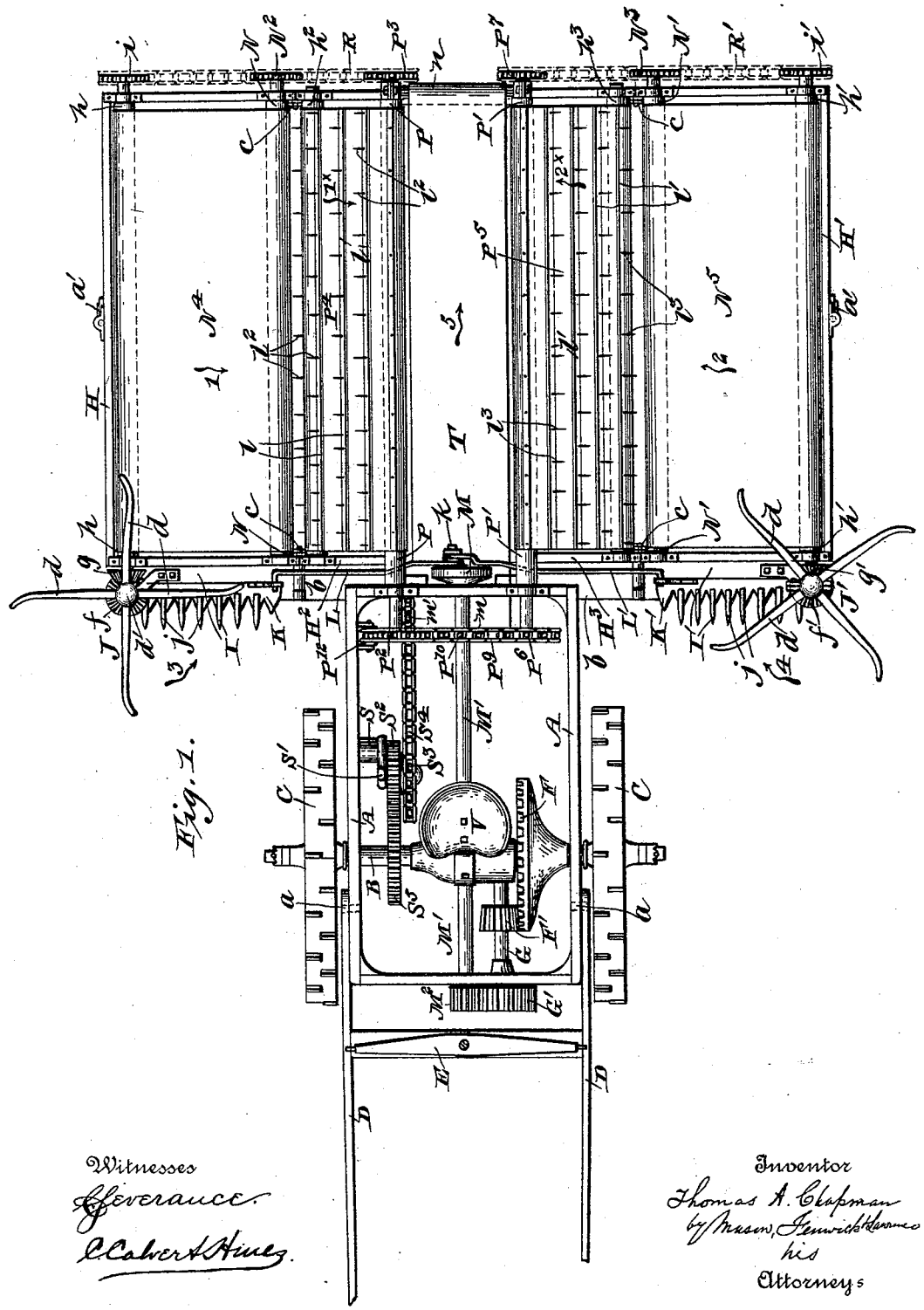
Figure 4:
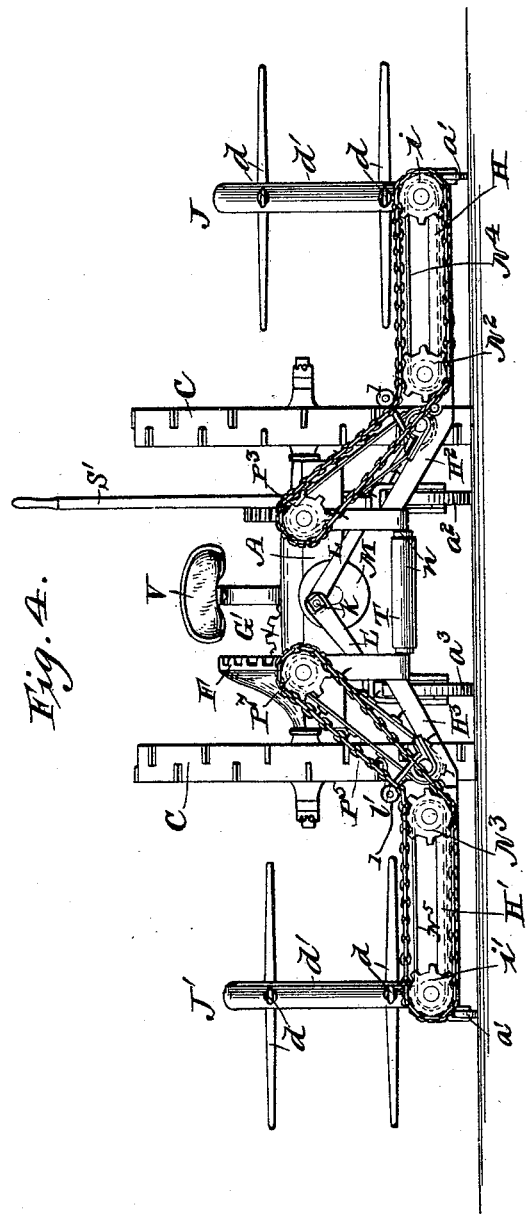

Figure 1 is a top view of my corn cutter and harvester. Fig. 2 is a longitudinal section of the same. Fig. 3 is a transverse section on a line just a little forward of the cutting apparatus and reels, looking backward; and Fig. 4 is a rear end view in which the parts forward of the rear end of the machine are shown.

A in the drawings is a draft frame provided with axle B and traction wheels C, which latter are loose on the axle B, being provided as usual, with ratchets and pawls so that they shall revolve with the axle when the machine is moving forward, and turn on the axle when the machine is backed or turned out of a straight path. To this frame shafts D with a whiffletree E are connected by pivot irons $a$, so that a tandem team may be attached for drawing the machine. A large beveled spur wheel F is provided on the axle B, and a small beveled pinion F' which gears with wheel F, is applied on a longitudinal shaft G, on the forward end of which is a cylindrical pinion G' for transmitting the motion for operating a portion of the mechanism, as will be hereinafter described. Near the rear end of this draft frame, two jointed frames H, H', $H^2$, $H^3$, are arranged, being rigidly connected by their portions $H^2$, $H^3$ to inclined pendants $b$ of the draft frame; said portions $H^2$, $H^3$, being connected to the portions H, H', by hinging pins or rods $c$. The frame portions H, H', are supported at their outer edges on casters $a'$ and the portions $H^2$, $H^3$, at their inner edges on casters $a^2$, $a^3$, so as to run easily upon the ground, and allow the machine to be also easily turned around. On the frame of the portions H, H', short finger beams I, I' are applied, said finger beams terminating outside the rear corners of the draft frame so as to leave a long space between their inner ends for the convenient connection thereto, by the hinging pins or rods $c$, of the inclined pendants of the draft frame. At the extreme outer ends of the finger beams, revolving reels J, J', consisting of horizontal arms $d$ and vertical shafts $d'$ are arranged, the lower ends of the vertical shafts being boxed in strong brackets $e$ bolted to the finger beams, and having bevel wheels $f$, $f'$ on them below their boxes, which gear with bevel wheels $g$, $g'$ on journals of revolving rollers $h$, $h'$ which are boxed in the hinge frame portion, H, H', and carry sprocket wheels $i$ $i'$, on their rear ends. On the finger beams saw toothed cutters K, K', are arranged to move freely under the caps or guards of the fingers $j$. These cutters are connected by inclining connecting rods L, L' to the wrist pin $k$ of a disk or crank arm, as M, which is on the rear end of a central revolving shaft M' of the draft frame, said shaft carrying a pinion $M^2$ on its forward end, which gears with the power transmitting pinion G'.

At the inner edges of the frame portions H, H' are apron rollers N, N', carrying on their rear journaled ends, sprocket wheels $N^2$, $N^3$, and at the upper edges of the frame portions $H^2$, $H^3$ are apron rollers P, P' the roller P carrying on its front and rear journaled ends sprocket wheels $P^2$, and $P^3$ and the roller P', sprocket wheels $P^6$, $P^7$. Around the rollers $h$, N, $h'$, N' plain endless aprons $N^4$, $N^5$, are arranged to revolve in the direction of the arrows, 1 and 2, and on the rollers P, P', and ungeared rollers $h^2$, $h^3$, inclined aprons $P^4$, $P^5$, with slats $l$, $l'$, having pins $l^2$, $l^3$, in them, are arranged to revolve in the direction of the arrows 1, 2. The aprons $N^4$, $N^5$ and $P^4$, $P^5$ are, preferably, geared in pairs at their rear ends by means of sprocket chains R, R' passed respectively around the respective triplet sets and under idler rollers $l$, $l$. The sprocket wheels on the front ends of the rollers P, P' are geared together by a sprocket chain $P^9$, and this chain passes around the sprocket wheel $P^6$, and also around a sprocket wheel $P^{10}$ on the shaft M', and under the sprocket wheel $P^2$, and then around a plain pulley or sprocket wheel $p^{12}$ attached to the draft frame. With the machine thus geared, the set of inclined aprons, and also set of horizontal aprons, will revolve toward the center of the draft frame as indicated by the arrows 1, 2, 1 and 2 and the reels will be caused to revolve inward as indicated by the arrows 3, 4. Between the sets of aprons described, an apron T, revolving in the direction of the arrow 5 is provided. This apron is arranged on rollers $m$, $n$, one of which $m$, is provided with a sprocket wheel $m'$.

On the draft frame, a pivot S for an angular hand lever S' carrying a spur wheel $S^2$ and a sprocket wheel $S^3$, is applied; and around the sprocket wheel $m$ and the sprocket wheel $S^3$, a sprocket chain $S^4$ is passed. The pinion $S^2$ is arranged in such relation to a larger toothed wheel $S^5$ on the axle B that it can be thrown into and out of gear with said toothed wheel. When it is out of gear, the sprocket chain becomes slack and no motion is imparted to the apron T, and said apron remains still until the other aprons have deposited a sufficient quantity upon it for forming a shock, whereupon, by adjusting the pinion $S^2$, by means of the hand lever S', in gear with the toothed wheel $S^5$, the chain will be tightened and the apron T set in motion and caused to discharge the gathered load upon the ground between the ridges of the two rows of corn that are being cut and harvested.

It is plain that the saw toothed cutter bars are vibrated rapidly against the corn stalks that are reeled in against them, that the aprons catch the falling corn and convey it over upon the intermittently revolved apron T and that when the proper quantity has fallen upon said apron, the driver from his seat V throws the pinion $S^2$ in gear with the toothed wheel $S^5$ and thereby set said apron T revolving, thus causing it to discharge the gathered quantity upon the ground.

What I claim as my invention is—

1. The combination of the forward wheeled draft frame A provided with two gears F, $S^5$, on its axle, two longitudinal shafts G, M', one carrying power transmitting portions F', G' and the other a pinion $M^2$, a sprocket wheel $P^{10}$, a disk M provided with an eccentric or crank pin $k$, a toothed wheel $S^2$ and a sprocket wheel $S^3$ applied to a lever pivoted to the draft frame, two apron frames attached to pendants of the draft frame near the rear corners of the same, said apron frames being mounted on suitable wheels, and provided at front with separate finger bars and in rear of said bars with endless aprons arranged on rollers; saw toothed cutting bars connected by rods to the wrist or crank pin of the disk; revolving reels on the outer front corners of the finger bars, sprocket wheels on the rear ends of the three sets of apron rollers and on the forward ends of one set of said rollers, sprocket chains, one of said chains engaging two of the front sprocket wheels of the apron rollers and the sprocket wheel $P^{10}$ passing around a pulley attached to the draft frame, and the other chain around three sets of the rear sprocket wheels; an intermittently revolved, longitudinal central apron arranged upon rollers, upon which the cut and harvested corn is deposited, and by which it is discharged, substantially as described.

2. The combination with the front central draft frame provided with driving gearing and means for throwing a spur and sprocket wheel thereof in and out of gear, two side jointed platform aprons having horizontal and inclined endless aprons running on driven rollers, and provided with separate finger beams, short, separate, saw toothed, vibrating cutters, a central intermittently revolved longitudinal apron arranged on rollers, one of which is provided with a gear, means for revolving the aprons, one of them intermittently and the others continuously, and revolving reels, substantially as described.

3. In a corn cutter and harvester, the hinged horizontal apron frame portions, in combination with the inclined side apron frame portions, and the central intermittently revolved longitudinal apron, substantially as described.

4. In a corn cutter and harvester, the combination of horizontal apron frame portions, inclined side apron frame portions, an intermittently revolved longitudinal apron, finger beams and cutters, a front sprocket chain arranged around a pulley attached to the front draft frame, passed under a single sprocket chain wheel and around two sprocket wheels; said latter sprocket wheels being on two of the apron roller shafts and the single sprocket wheel on the cutter operating shaft, substantially as described.

In testimony whereof I hereunto affix my signature in presence of two witnesses.

THOMAS A. CHAPMAN.

Witnesses:
CASSELL SEVERANCE,
W. HARVEY MUZZY.